US009487679B2

(12) United States Patent
Ogata et al.

(10) Patent No.: US 9,487,679 B2
(45) Date of Patent: Nov. 8, 2016

(54) ACRYLIC ADHESIVE TAPE AND METHOD OF PRODUCING THE SAME

(75) Inventors: Takanori Ogata, Tochigi (JP); Azumi Koike, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 371 days.

(21) Appl. No.: 13/877,348

(22) PCT Filed: Sep. 27, 2011

(86) PCT No.: PCT/JP2011/071951
§ 371 (c)(1),
(2), (4) Date: May 8, 2013

(87) PCT Pub. No.: WO2012/049962
PCT Pub. Date: Apr. 19, 2012

(65) Prior Publication Data
US 2013/0224417 A1     Aug. 29, 2013

(30) Foreign Application Priority Data
Oct. 13, 2010   (JP) .................................. 2010-230673

(51) Int. Cl.
*C09J 133/00*     (2006.01)
*C09J 7/02*       (2006.01)
(Continued)

(52) U.S. Cl.
CPC .............. *C09J 133/00* (2013.01); *C08L 33/04* (2013.01); *C09J 7/00* (2013.01); *C09J 7/02* (2013.01);
(Continued)

(58) Field of Classification Search
CPC ............... C08L 33/04; C08L 2205/02; C08L 2312/02; C08K 5/0025
See application file for complete search history.

(56) References Cited

U.S. PATENT DOCUMENTS

2009/0186164 A1* 7/2009 Hirao ...................... C08F 2/50
427/516

FOREIGN PATENT DOCUMENTS

CN    101392166 A      3/2009
JP    10036782 A    *  2/1998
(Continued)

OTHER PUBLICATIONS

Dec. 20, 2011 International Search Report issued in International Application No. PCT/JP2011/071951 (with translation).
(Continued)

*Primary Examiner* — Dah-Wei D Yuan
*Assistant Examiner* — Kristen A Dagenais
(74) *Attorney, Agent, or Firm* — Oliff PLC

(57) ABSTRACT

An acrylic adhesive tape exhibiting good adhesion to a curved surface and good peel characteristics under a constant load even in the absence of a cross-linking agent includes an acrylic adhesive layer photo-polymerized by irradiation with ultraviolet rays. The acrylic adhesive layer contains: an acrylic polymer A formed by irradiating a solvent-free photo-polymerizable monomer composition containing an acrylic monomer and a photopolymerization initiator with ultraviolet rays so that the acrylic polymer A is formed by photopolymerization of the acrylic monomer and has a weight average molecular weight of 700,000 to 3,000,000 when a cross-linking agent is absent; an acrylic polymer B having a weight average molecular weight of 350,000 to 650,000; and an adhesion-imparting polymer having a weight average molecular weight of 2,000 to 10,000. The acrylic adhesive layer has a molecular weight distribution of 2.4 to 4.4.

18 Claims, 7 Drawing Sheets

(51) Int. Cl.
*C08L 33/04* (2006.01)
*C09J 7/00* (2006.01)
*C08K 5/00* (2006.01)

(52) U.S. Cl.
CPC .......... *C08K 5/0025* (2013.01); *C08L 2312/06* (2013.01); *C09J 2205/102* (2013.01); *C09J 2433/00* (2013.01); *Y10T 428/1462* (2015.01)

(56) References Cited

FOREIGN PATENT DOCUMENTS

| JP | A-10-36782 | 2/1998 |
| JP | A-10-219210 | 8/1998 |
| JP | A-2001-49200 | 2/2001 |
| JP | 2003049130 A * | 2/2003 |
| JP | A-2003-49130 | 2/2003 |
| TW | 200827422 A | 7/2008 |

OTHER PUBLICATIONS

May 15, 2015 Office Action issued in Taiwanese Application No. 100136037.
May 7, 2015 Office Action issued in JP Application No. 2011-210044.
Mar. 26, 2014 Office Action issued in Chinese Application No. 201180049509.X (with translation).
Jan. 19, 2016 Office Action issued in Japanese Patent Application No. 2011-210044.

* cited by examiner

ACRYLIC ADHESIVE TAPE AND METHOD OF PRODUCING THE SAME

TECHNICAL FIELD

The present invention relates to an acrylic adhesive tape including an acrylic adhesive layer formed by photo-curing under ultraviolet irradiation and to a method of producing the same.

BACKGROUND ART

Acrylic adhesive tapes including acrylic adhesive layers cured by ultraviolet irradiation are widely used for automobiles, electrical products, buildings, etc. to join structural materials to each other or a component to a structural material. In one proposal to produce such an acrylic adhesive tape, a solvent-free resin composition containing an acrylic monomer, a thermally polymerized or photo-polymerized acrylate polymer having a preferable weight average molecular weight of 100,000 to 200,000, a high-Tg low molecular weight polymer having a weight average molecular weight of 20,000 or less and used to impart adhesion, a photopolymerization initiator, and a cross-linking agent is applied to a support to form a coating film, and the coating film is subjected to photopolymerization (Patent Literature 1).

CITATION LIST

Patent Literature

Patent Literature 1: Japanese Patent Application Laid-Open No. 2003-49130.

SUMMARY OF INVENTION

Technical Problem

In an acrylic adhesive tape including an acrylic adhesive layer, the acrylic adhesive layer may be formed by UV curing performed in the absence of a cross-linking agent that may result in a reduction in adhesion to a curved surface or peel characteristics under a constant load, in order for the acrylic adhesive tape to be applicable to different materials and surface conditions of various adherends. Even in such a case, there is a need for the acrylic adhesive tape to exhibit good adhesion to a curved surface and good peel characteristics under a constant load.

However, in the acrylic adhesive tape in Patent Literature 1, UV curing (ultraviolet curing) is performed always in the presence of a cross-linking agent, and it is certainly not assumed that UV curing is performed in the absence of a cross-linking agent. Therefore, there is a need to find conditions for photo-curing of an acrylic adhesive tape that are suitable for obtaining good adhesion to a curved surface and good peel characteristics under a constant load even in the absence of a cross-linking agent.

It is an object of the present invention to solve the foregoing conventional problems and to allow an acrylic adhesive tape including an acrylic adhesive layer photo-cured by ultraviolet irradiation to exhibit good adhesion to a curved surface and good peel characteristics under a constant load even in the absence of a cross-linking agent.

Solution to Problem

The present inventors have found that an acrylic adhesive tape exhibiting good adhesion to a curved surface and good peel characteristics under a constant load even in the absence of a cross-linking agent can be obtained by forming an acrylic adhesive layer using an acrylic polymer mixture of a relatively high molecular weight acrylic polymer and a low molecular weight acrylic polymer and a very low molecular weight adhesion-imparting polymer added to the acrylic polymer mixture and controlling the molecular weight distribution of the acrylic adhesive layer within a specific range. The present inventors have also found that the above object can be achieved by preparing such an acrylic polymer mixture as follows. First, an acrylic monomer composition containing a photopolymerization initiator is subjected to photopolymerization to prepare a polymer syrup containing a relatively high molecular weight acrylic polymer. Then a very low molecular weight adhesion-imparting polymer is added to the polymer syrup, and the resultant polymer syrup is formed into a film. Next, an unreacted portion of the acrylic monomer remaining in the film is photo-polymerized to form a relatively low molecular weight acrylic polymer, and an acrylic adhesive layer having a relatively wide molecular weight distribution is thereby formed. Thus, the present invention has been completed.

Accordingly, the present invention provides an acrylic adhesive tape comprising a release film substrate and an acrylic adhesive layer formed thereon, wherein the acrylic adhesive layer contains: an acrylic polymer A formed by irradiating a solvent-free photo-polymerizable monomer composition containing an acrylic monomer and a photo-polymerization initiator with ultraviolet rays so that the acrylic polymer A is formed by photopolymerization of the acrylic monomer and has a weight average molecular weight of 700,000 to 3,000,000 when a cross-linking agent is absent; an acrylic polymer B having a weight average molecular weight of 350,000 to 650,000; and an adhesion-imparting polymer having a weight average molecular weight of 2,000 to 10,000, wherein the acrylic adhesive layer has a molecular weight distribution of 2.4 to 4.4.

The present invention also provides a method of producing an acrylic adhesive tape including a release film substrate and an acrylic adhesive layer formed thereon, the method comprising the following steps (a) to (d):

step (a) of irradiating a solvent-free photo-polymerizable monomer composition containing an acrylic monomer and a photopolymerization initiator with ultraviolet rays to produce an acrylic polymer A from the acrylic monomer by photopolymerization, the acrylic polymer A having a weight average molecular weight of 700,000 to 3,000,000 when a cross-linking agent is absent, to thereby prepare a polymer syrup containing the acrylic polymer A and an unreacted portion of the acrylic monomer;

step (b) of mixing an adhesion-imparting polymer having a weight average molecular weight of 2,000 to 10,000 with the polymer syrup to prepare an adhesive coating solution;

step (c) of applying the adhesive coating solution to the release film substrate to form an adhesive coating film; and step (d) of irradiating the adhesive coating film with ultraviolet rays to produce an acrylic polymer B from the unreacted portion of the acrylic monomer in the adhesive coating film by photopolymerization, the acrylic polymer B having a weight average molecular weight of 350,000 to 650,000 when a cross-linking agent is absent, to thereby form an acrylic adhesive layer having a molecular weight distribution of 2.4 to 4.4.

Advantageous Effects of Invention

The acrylic adhesive tape of the present invention is configured to include the acrylic adhesive layer composed of: an acrylic polymer mixture of a high molecular weight acrylic polymer having a weight average molecular weight of 700,000 to 3,000,000 and a low molecular weight acrylic polymer having a weight average molecular weight of 350,000 to 650,000; and a very low molecular weight adhesion-imparting polymer added to acrylic polymer mixture and having a weight average molecular weight of 2,000 to 10,000. In addition to this, the molecular weight distribution of the acrylic adhesive layer is controlled within a specific range. Therefore, the acrylic adhesive tape can exhibit good adhesion to a curved surface and good peel characteristics under a constant load even in the absence of a cross-linking agent.

In the method of producing an acrylic adhesive tape according to the present invention, an acrylic monomer composition containing a photopolymerization initiator is photo-polymerized to prepare a polymer syrup containing an acrylic polymer having a weight average molecular weight of 700,000 to 3,000,000. An adhesion-imparting polymer having a weight average molecular weight of 2,000 to 10,000 is added to the polymer syrup, and the resultant polymer syrup is formed into a film. Then an unreacted portion of the acrylic monomer remaining in the film is photo-polymerized to form an acrylic polymer having a weight average molecular weight of 350,000 to 650,000, whereby an acrylic adhesive layer having a relatively wide molecular weight distribution is formed. Therefore, good adhesion to a curved surface and good peel characteristics under a constant load can be imparted to the obtained acrylic adhesive tape even in the absence of a cross-linking agent.

DESCRIPTION OF EMBODIMENTS

Figure 1:
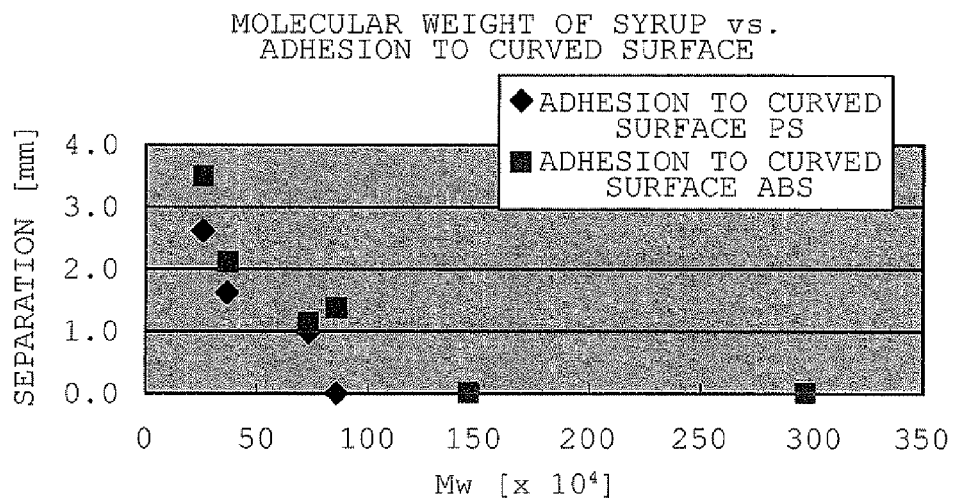
FIG. 1 is a graph showing the relation between the molecular weight of a polymer syrup and adhesion to a curved surface in Examples 1 to 4 and Comparative Examples 1 and 2.

The acrylic adhesive tape of the present invention has a basic structure in which an acrylic adhesive layer is formed on a release film substrate. In the structure in another embodiment, acrylic adhesive layers are formed as a stacked-type acrylic adhesive layer including the acrylic adhesive layers formed on opposite sides of a nonwoven fabric. The structure in the latter embodiment can be used as a double-sided adhesive transfer tape that can be repeatedly affixed and removed.

The acrylic adhesive layer constituting the acrylic adhesive tape of the present invention contains: an acrylic polymer A formed by irradiating a solvent-free photo-polymerizable monomer composition containing an acrylic monomer and a photopolymerization initiator with ultraviolet rays so that the acrylic polymer A is formed by photo-polymerization of the acrylic monomer and has a weight average molecular weight of 700,000 to 3,000,000 and preferably 750,000 to 1,000,000 when a cross-linking agent is absent; an acrylic polymer B formed by photopolymerization of the acrylic monomer and having a weight average molecular weight of 350,000 to 650,000 and preferably 450,000 to 650,000 in the absence of a cross-linking agent; and an adhesion-imparting polymer having a weight average molecular weight of 2,000 to 10,000 and preferably 3,000 to 8,000. The molecular weight distribution of the acrylic adhesive layer is 2.4 to 4.4, preferably 2.6 to 4.4, and more preferably 2.7 to 3.5 when a cross-linking agent is absent. In the present description, the numerical value of weight average molecular weight is measured by a gel permeation method.

The weight average molecular weight of the acrylic polymer A constituting the solvent-free photo-polymerizable monomer composition is 700,000 to 3,000,000, as described above. This is because, when the molecular weight falls below the above range, the holding power of the acrylic adhesive tape becomes low and because, when the molecular weight exceeds the above range, the probability of a reduction in peel characteristics under a constant load increases.

If a specific acrylic monomer is selected, such a probability is not required to be taken into consideration, but this is a rare case. However, as described later, when the solvent-free photo-polymerizable monomer composition contains a cross-linking agent, the molecular weight distribution characterized in the present invention is easily achieved. Therefore, in consideration of the above probability, the weight average molecular weight of the acrylic polymer A is controlled to fall within the range of 700,000 to 3,000,000.

The weight average molecular weight of the acrylic polymer B constituting the solvent-free photo-polymerizable monomer composition is 350,000 to 650,000, as described above. This is because, when the molecular weight falls below the above range, the adhesion of the acrylic adhesive tape to a curved surface becomes low and because, when the molecular weight exceeds the above range, the probability of a reduction in peel characteristics under a constant load increases. It is difficult to measure the molecular weight of the acrylic polymer B alone. However, the molecular weight of the acrylic polymer B can be determined by subtracting the molecular weights of parts corresponding to the acrylic polymer A and the adhesion-imparting polymer from the molecular weight of the overall acrylic adhesive layer obtained by polymerizing the acrylic monomer described later in the presence of the acrylic polymer A and the adhesion-imparting polymer described later. More specifically, let the weight average molecular weight of the overall acrylic adhesive layer measured by gel permeation chromatography be Wt, the weight average molecular weight of the acrylic polymer A be Wa, and the weight average molecular weight of the adhesion-imparting polymer be Wc. Then the weight average molecular weight Wb of the acrylic polymer B can be determined by subtracting Wa and Wc from Wt. When Wc<<Wt and Wa, Wc may be omitted to compute Wb.

When the weight average molecular weight of the acrylic adhesive layer is measured by gel permeation chromatography using as an eluent a solvent that is a poor solvent for the acrylic polymer A but can dissolve the acrylic polymer B, the molecular weights of the acrylic polymer B and the adhesion-imparting polymer are reflected in the obtained weight average molecular weight. However, it the weight average molecular weight of the adhesion-imparting polymer is significantly smaller than that of the acrylic polymer B, the above-obtained weight average molecular weight can be considered substantially as the weight average molecular weight of the acrylic polymer B.

The molecular weight distribution of the acrylic adhesive layer, i.e., the molecular weight distribution of a cured resin composition composed mainly of the acrylic polymer A, the adhesion-imparting polymer, and the acrylic polymer B, is 2.4 to 4.4 when a cross-linking agent is absent. If the molecular weight distribution falls below the above range, the peel characteristics of the acrylic adhesive tape under a constant load become low. If the molecular weight distribution exceeds the above range, cohesion becomes excessively high, and the probability of a reduction in tackiness increases.

Examples of the acrylic monomer used for the solvent-free photo-polymerizable monomer composition forming the acrylic polymers A and B may include (meth)acrylates and (meth)acrylic acid. The term "(meth)acrylic acid" is meant to include "acrylic acid" and "methacrylic acid." Similarly, the term "(meth)acrylate" is meant to include "acrylate" and "methacrylate."

Examples of the (meth)acrylate used as a preferred acrylic monomer may include: linear and branched alkyl(meth) acrylates such as methyl(meth)acrylate, ethyl(meth)acrylate, n- and iso-propyl(meth)acrylates, n-, iso-, and tert-butyl (meth)acrylates, pentyl(meth)acrylate, hexyl(meth)acrylate, and 2-ethylhexyl(meth)acrylate; cycloalkyl(meth)acrylates such as cyclohexyl(meth)acrylate; alkenyl(meth)acrylates such as allyl(meth)acrylate; aryl(meth)acrylates such as phenyl(meth)acrylate; aralkyl(meth)acrylates such as benzyl (meth)acrylate; and aryloxy alkyl(meth)acrylates such as phenoxy ethyl(meth)acrylate. A substituent such as a hydroxyl group or an alkoxy group may be bonded to the above (meth)acrylates.

A combination of an alkyl(meth)acrylate which may be substituted with a hydroxy group and (meth)acrylic acid is preferably used as the acrylic monomers. More specifically, a combination of 2-ethylhexyl acrylate, butyl acrylate, acrylic acid, and 2-hydroxyethyl acrylate is preferably used. The amounts of these components mixed will next be described. If the amount of 2-ethylhexyl acrylate mixed is too large, the 180 degree peel strength of the acrylic adhesive tape becomes high, but its peel characteristics under a constant load tend to become low. Therefore, the ratio of 2-ethylhexyl acrylate is preferably 25 to 35 parts by mass based on 100 parts by mass of the total of 2-ethylhexyl acrylate and butyl acrylate, and the ratio of butyl acrylate is preferably 75 to 65 parts by mass. If the amount of the acrylic acid mixed is too small, the holding power of the acrylic adhesive tape tends to become low. If the amount thereof is too large, the adhesion of the acrylic adhesive tape to a nonpolar resin tends to become low. Therefore, the amount of the acrylic acid is preferably 1 to 10 parts by mass and more preferably 3 to 5 parts by mass based on 100 parts by mass of the total of 2-ethylhexyl acrylate and butyl acrylate. In the case in which a cross-linking agent is required, if the amount of 2-hydroxyethyl acrylate added is too small, the cross-linking density tends to become low, and the holding power becomes low. Therefore, the amount of 2-hydroxyethyl acrylate is preferably 0.2 to 0.5 parts by mass.

A well-known chain transfer agent may be added to the solvent-free photo-polymerizable monomer composition used in the present invention, in order to control the weight average molecular weight of a polymer to be produced. Examples of such a chain transfer agent include thiols, particularly alkyl thiols, and specific examples thereof may include n-dodecyl mercaptan. The amount of the chain transfer agent added to the solvent-free photo-polymerizable monomer composition is preferably 1 to 0.16 parts by mass based on 1 part by mass of the photopolymerization initiator.

A general radical photopolymerization initiator or a general cationic photopolymerization initiator can be used as the photopolymerization initiator constituting the solvent-free photo-polymerizable monomer composition. Examples of such photopolymerization initiators may include: acetophenone-based photopolymerization initiators such as 4-(2-hydroxyethoxy)phenyl(2-hydroxy-2-propyl)ketone [DC (DAROCUR) 2959, Nihon Ciba-Geigy K.K.], α-hydroxy-α,α'-dimethylacetophenone [DC1173, Nihon Ciba-Geigy K.K.], methoxyacetophenone, 2,2-dimethoxy-2-phenylacetone [IRG (IRGACURE) 651, Nihon Ciba-Geigy K.K.], and 2-hydroxy-2-cyclohexylacetophenone [IRG-184, Nihon Ciba-Geigy K.K.]; ketal-based photopolymerization initiators such as benzyl dimethyl ketal; and other photopolymerization initiators such as halogenated ketones, acylphosphine oxides (for example, bis(2,4,6-trimethylbenzoyl)-phenylphosphine oxide [IRG819, Nihon. Ciba-Geigy K.K.]), and acylphosphonate.

If the amount of the photopolymerization initiator added to the solvent-free photo-polymerizable monomer composition is too small, the polymerization reaction does not proceed. If the amount is too large, the weight average molecular weight of a polymer obtained by the polymerization reaction tends to become low. Therefore, the amount of the photopolymerization initiator is preferably 0.005 to 0.1 parts by mass based on 100 parts by mass of the acrylic monomers.

The reason that the weight average molecular weight of the adhesion-imparting polymer included in the acrylic adhesive layer is set to 2,000 to 10,000 in the present invention is as follows. If the molecular weight falls below the above range, the holding power of the acrylic adhesive tape tends to become low. If the molecular weight exceeds the above range, the compatibility of the adhesion-imparting polymer with the acrylic polymers A and B tends to become low, and stable adhesion is not obtained.

The adhesion-imparting polymer used may be any well-known adhesion-imparting polymers. Among these, an acrylic adhesion-imparting polymer can be preferably used, from the viewpoint of compatibility with the acrylic polymers A and B used in combination with the adhesion-imparting polymer. Preferred examples of the acrylic adhesion-imparting polymer may include a polymer produced by photopolymerization of a cycloalkyl(meth)acrylate, (meth)acrylic acid, a photopolymerization initiator, and a thiol. More specifically, such a polymer is produced by photopolymerization of cyclohexyl methacrylate, methacrylic acid, n-dodecyl mercaptan (a chain transfer agent), and a photopolymerization initiator. The amounts of these components mixed will next be described. Generally, if the amount of cyclohexyl(meth)acrylate (preferably cyclohexyl methacrylate) used is too small, the adhesion of the acrylic adhesive tape to a nonpolar resin tends to become low. If the amount is too large, the compatibility of the adhesion-imparting polymer with the acrylic polymers A and B tends to become low. However, in the present invention, in the case in which the preferred amount of cyclohexyl(meth)acrylate added is set to 95 to 97 parts by mass, if the amount of (meth)acrylic acid (preferably methacrylic acid) added is too small, the compatibility of the adhesion-imparting polymer with the acrylic polymers A and B tends to become low. If the amount is too large, the (meth)acrylic acid tends to be selectively reacted to cause gelation. Therefore, the amount of (meth)acrylic acid is preferably 3 to 5 parts by mass. If the amount of n-dodecyl mercaptan added is too small, the weight average molecular weight of the adhesion-imparting polymer tends to become excessively high. If the amount is too large, the weight average molecular weight tends to become excessively low. Therefore, the amount of n-dodecyl mercaptan is preferably 3 to 6 parts by mass. If the amount added of the photopolymerization initiator described in step (a) is too small, the polymerization reaction tends to not proceed. If the amount is too large, the weight average molecular weight of the adhesion-imparting polymer tends to become low. Therefore, the amount of the photopolymerization initiator is preferably 0.25 to 0.5 parts by mass based on 100 parts by mass of the total of the monomers.

If the amount of the adhesion-imparting polymer added is too small, the acrylic adhesive tape tends to be hard to bond to a resin having low surface energy. If the amount is too large, the holding power tends to become low. Therefore, the amount of the adhesion-imparting polymer is preferably 10 to 30 parts by mass based on 100 parts by mass of the total of the monomers.

The solvent-free photo-polymerizable monomer composition constituting the acrylic adhesive tape of the present invention may contain a cross-linking agent that contributes to the initiation of a cross-linking reaction during photopolymerization by ultraviolet irradiation, in order to improve the holding power of the acrylic adhesive tape.

However, when the weight average molecular weight of the acrylic polymer A exceeds 1,000,000, the use of the cross-linking agent increases the cohesion of the acrylic adhesive layer but unfortunately causes a reduction in peel characteristics under a constant load. Therefore, it is desirable to use the cross-linking agent in combination with the acrylic polymer A having a weight average molecular weight in the range of 700,000 to 1,000,000.

Examples of the cross-linking agent include compounds having an epoxy group (multifunctional epoxy compounds) and compounds having an isocyanate group (multifunctional isocyanate compounds). Specific examples of the compounds having an epoxy group may include: epoxy compounds such as bisphenol A-type epoxy resins, epichlorohydrin-type epoxy resins, ethylene glycidyl ether, polyethylene glycol diglycidyl ether, glycerin diglycidyl ether, glycerin triglycidyl ether, 1,6-hexanediol glycidyl ether, trimethylolpropane triglycidyl ether, diglycidylaniline, diamine glycidylamine, tetraglycidyl-m-xylenediamine, and 1,3-bis(N,N'-diamineglycidylaminomethyl)cyclohexane. Specific examples of the compounds having an isocyanate group may include: isocyanate compounds such as tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, and polymethylene polyphenyl isocyanate; and adducts of these isocyanate compounds and polyols such as trimethylolpropane.

In the case in which the cross-linking agent is used, if the amount of the cross-linking agent added to the solvent-free photo-polymerizable monomer composition is too small, the polymerization reaction of the acrylic monomers tends to not proceed. If the amount is too large, the weight average molecular weight of the polymer obtained by the polymerization reaction tends to become small. Therefore, the amount of the cross-linking agent is preferably 0.005 to 0.1 parts by mass based on 100 parts by mass of the acrylic monomers.

A release film substrate used for a conventional acrylic adhesive tape can be used as the release film substrate constituting the acrylic adhesive tape of the present invention. For example, a polyethylene terephthalate film, high-quality paper, etc. subjected to silicone release treatment on both sides can be preferably used.

When the acrylic adhesive tape of the present invention includes a stacked-type acrylic adhesive layer composed of acrylic adhesive layers stacked through a nonwoven fabric, the nonwoven fabric used may be any of a meltblown nonwoven fabric, a carded nonwoven fabric, a spunbonded nonwoven fabric, a spunlace nonwoven fabric, etc. formed of polyester, polypropylene, etc. and having a thickness of 30 to 60 μm.

The acrylic adhesive tape of the present invention described above can be produced by a production method including the following steps (a) to (d). Each of the steps will next be described.

<Step (a)>

This step is a step for preparing a polymer syrup. More specifically, the solvent-free photo-polymerizable monomer composition containing the acrylic monomers and the photopolymerization initiator is irradiated with ultraviolet rays to produce the acrylic polymer A by photopolymerization of the acrylic monomers so that the acrylic polymer A has a weight average molecular weight of 700,000 to 1,000,000 when a cross-linking agent is absent. A polymer syrup containing the acrylic polymer A and unreacted portions of the acrylic monomers is thereby prepared.

The polymer syrup, which is the target product prepared in this step, contains the unreacted acrylic monomers and the acrylic polymer A having a weight average molecular weight of 700,000 to 3,000,000 and preferably 750,000 to 1,000,000 when a cross-linking agent is absent. Particularly, a preferred weight average molecular weight of the acrylic polymer A in the presence of a cross-linking agent is 750,000 to 1,000,000.

If the viscosity (25° C.) of the polymer syrup (B-type viscometer, rotor No. 2, 25° C.) is too low, it is difficult to maintain the thickness of an adhesive coating film in step (d). If the viscosity (25° C.) is too high, air is easily caught in the polymer syrup, and reaction inhibition tends to occur because of the influence of oxygen. Therefore, the viscosity is preferably 200 to 5,000 cps and more preferably 800 to 2,000 cps.

For the purpose of obtaining coating viscosity suitable for step (d), the ratio of the acrylic polymer A to the unreacted acrylic monomers present in the polymer syrup can be substituted by the polymerization rate of the solvent-free photo-polymerizable monomer composition used for preparation of the polymer syrup. The polymerization rate used instead of the above ratio is preferably 5 to 25% and more preferably 10 to 15%. This is because of the following reasons. If the polymerization rate is too low, the holding power and adhesion to a curved surface tend to become low. If the polymerization rate is too high, the amount of the acrylic polymer B produced in step (b) decreases, and therefore the peel characteristics under a constant load tend to deteriorate. The polymerization rate is computed as follows. 0.5 g of the polymer syrup is weighed, placed in a container reduced in pressure to 660 Pa, and left to stand at 120° C. for 2 hours to volatilize volatile components. The resultant polymer syrup is weighed again to determine the amount of weight reduction. The amount of weight reduction is considered to be due to remaining monomers and oligomers, and the polymerization rate is determined using the following formula.

Polymerization rate [%]=[1−(amount of weight reduction/weight of adhesive before volatilization treatment)]×100

In step (a), the solvent-free photo-polymerizable monomer composition is irradiated with ultraviolet rays under stirring to perform the photopolymerization reaction. Preferred ultraviolet irradiation conditions are as follows.

1) To prevent a chain transfer termination reaction due to oxygen during the photopolymerization reaction, the photopolymerization reaction is performed in an inert gas atmosphere such as the flow of nitrogen, argon gas, etc.

2) To control the reaction rate within an appropriate range and to prevent the occurrence of a side reaction, the temperature during the photopolymerization reaction is preferably 25 to 130° C. and more preferably 40 to 120° C.

3) The wavelength of the ultraviolet rays used is 250 to 400 nm, which is the wavelength of light from a light source used for such photopolymerization (for example, an insect trapping lamp, a high pressure mercury lamp, or a black light).

4) To control the reaction rate within an appropriate range and to prevent the occurrence of a side reaction, the output power of the ultraviolet rays is preferably 15 to 100 mW/cm$^2$.

5) Preferably, the irradiation with ultraviolet rays is performed intermittently, in order for the prepared polymer syrup to contain an appropriate amount of solids and to have an appropriate viscosity and an appropriate molecular weight. In this case, if the time of irradiation with ultraviolet rays is too short, the required energy is not obtained, so that the reaction does not proceed. If the time of irradiation is too long, the reaction proceeds at an accelerated pace. Therefore, the time of irradiation is preferably 10 to 60 seconds, and the irradiation is performed preferably 5 to 20 times at prescribed intervals (idling intervals of 20 to 40 seconds). The reason that the irradiation with ultraviolet rays is performed not continuously but intermittently is to prevent an excessive increase in polymerization reaction temperature. The reason that the preferred idling intervals are set to 20 to 40 seconds is as follows. If the idling intervals are too short, an excessive increase in polymerization reaction temperature cannot be prevented. If the idling intervals are too long, the prescribed polymerization reaction temperature tends to not be maintained. In addition, the reason that the number of times of irradiation is set to preferably about 5 to 20 is that, if the number of times of irradiation is too small or too large, a polymer syrup containing an appropriate amount of solids and having an appropriate viscosity and an appropriate molecular weight cannot be obtained.

<Step (b)>

This step is a step of preparing an adhesive coating solution using the polymer syrup obtained in step (a). More specifically, the polymer syrup is mixed with an adhesion-imparting polymer having a weight average molecular weight of 2,000 to 10,000 and preferably 3,000 to 8,000 to prepare an adhesive coating solution.

If the viscosity (25° C.) of the adhesive coating solution (B-type viscometer, rotor No. 2, 25° C.) is too low, it is difficult to maintain the thickness of the adhesive coating film in step (d). If the viscosity is too high, air is easily caught, so that reaction inhibition tends to occur because of the influence of oxygen. Therefore, the viscosity is preferably 200 to 5,000 cps and more preferably 800 to 2,000 cps.

Preferred ultraviolet irradiation conditions for the photopolymerization reaction when the adhesion-imparting polymer used in step (b) is prepared may be the same as or different from those for the photopolymerization reaction in step (a). Representative conditions are as follows.

1) To prevent a chain transfer termination reaction due to oxygen during the photopolymerization reaction, the photopolymerization reaction is performed in an inert gas atmosphere such as the flow of nitrogen, argon gas, etc.

2) To control the reaction rate within an appropriate range and to prevent the occurrence of a side reaction, the temperature during the photopolymerization reaction is preferably 25 to 130° C. and more preferably 40 to 120° C.

3) The wavelength of the ultraviolet rays used is 250 to 400 nm, which is the wavelength of light from a light source used for such photopolymerization (for example, an insect trapping lamp, a high pressure mercury lamp, or a black light).

4) To control the reaction rate within an appropriate range and to prevent the occurrence of a side reaction, the output power of the ultraviolet rays is preferably 15 to 100 mW/cm$^2$.

5) If necessary, the irradiation with ultraviolet rays is performed as separate operations, i.e., irradiation at low power for a relatively long time and irradiation at high power for a relatively short time.

<Step (c)>

This step is a step of forming an adhesive coating film. More specifically, the adhesive coating solution obtained in step (b) is applied to a release film substrate to form the adhesive coating film.

The adhesive coating solution can be applied to the release film substrate using a well-known apparatus such as a doctor blade coater or a comma coater.

If the thickness of the adhesive coating film is too large, the ultraviolet rays do not reach a deep portion, and insufficient curing tends to occur. Therefore, the thickness is preferably less than 1.5 mm and more preferably less than 1.2 mm. The lower limit of the thickness can be appropriately determined according to the application purpose of the acrylic adhesive tape and is generally 0.015 to 0.02 mm.

When a stacked-type acrylic adhesive layer is used, a nonwoven fabric is stacked on a formed adhesive coating film, and another adhesive coating film is formed thereon.

<Step (d)>

This step is a step of forming an acrylic adhesive layer using the adhesive coating film formed in step (c). More specifically, the adhesive coating film is irradiated with ultraviolet rays to produce an acrylic polymer B by photopolymerization of unreacted portions of the acrylic monomers in the adhesive coating film so that the acrylic polymer B has a weight average molecular weight of 350,000 to 650,000 when a cross-linking agent is absent. An acrylic adhesive layer having a molecular weight distribution of 2.4 to 4.4, preferably 2.6 to 4.4, and more preferably 2.7 to 3.5 is thereby formed. In this manner, an acrylic adhesive tape having the acrylic adhesive layer formed on the release film substrate is obtained. A stacked-type acrylic adhesive layer is formed, when a stacked-type adhesive coating film including adhesive coating films stacked through a nonwoven fabric is formed.

The reason that the weight average molecular weight of the acrylic polymer B prepared in this step is 350,000 to 650,000 as described above may be that the viscosity of the reaction system increases as the polymerization proceeds, so that the migration of molecules is highly restricted. In this case, even when the unreacted acrylic monomers are polymerized, the weight average molecular weight of the resultant polymer is not as large as that of the acrylic polymer A.

In this step, the "acrylic adhesive layer having a molecular weight distribution of 2.4 to 4.4" means that the molecular weight distribution of the cured resin composition constituting the acrylic adhesive layer, i.e., the cured resin composition composed mainly of the acrylic polymer A, the adhesion-imparting polymer, and the acrylic polymer B, is 2.4 to 4.4.

The reason that the molecular weight distribution is set to 2.4 to 4.4 is as follows. If the molecular weight distribution falls below this range, the peel characteristics of the acrylic adhesive tape under a constant load deteriorate. If the molecular weight distribution exceeds this range, cohesion becomes excessively high, and the probability of a reduction in tackiness increases.

Preferred ultraviolet irradiation conditions for the photopolymerization reaction in this step (d) are different from those in steps (a) and (b). Specifically, ultraviolet irradiation is performed not intermittently but continuously to achieve a degree of polymerization of 80% or more. Representative conditions are as follows.

1) To prevent a chain transfer termination reaction due to oxygen during the photopolymerization reaction, the photopolymerization reaction is performed in an inert gas atmosphere such as the flow of nitrogen, argon gas, etc. Alternatively, the adhesive coating film is covered with a transparent release sheet formed from a polymer film such as a PET film subjected to release treatment on one side to block oxygen in the air, and then the photopolymerization reaction is performed.

2) To control the reaction rate within an appropriate range and to prevent the occurrence of a side reaction, the temperature during the photopolymerization reaction is preferably 40 to 90° C.

3) The wavelength of the ultraviolet rays used is 250 to 400 nm, which is the wavelength of light from a light source used for such photopolymerization (for example, an insect trapping lamp, a high pressure mercury lamp, or a black light).

4) To control the reaction rate within an appropriate range and to prevent the occurrence of a side reaction, the output power of the ultraviolet rays is preferably 15 to 100 mW/cm$^2$.

5) If the time of ultraviolet irradiation is too short, the required energy is not obtained, and the intended reaction does not proceed. If the time is too long, the reaction proceeds at an accelerated rate. Therefore, the time of ultraviolet irradiation is preferably 10 to 60 seconds.

An example of the production method of the invention in which no cross-linking agent is used has been described. However, in the present invention, a cross-linking agent may be added to the adhesive coating solution used in step (c) described above, in order to improve the holding power. The cross-linking agent may be added in step (b) or in step (c).

However, when the weight average molecular weight of the acrylic polymer A exceeds 1,000,000, the use of the cross-linking agent increases the cohesion, but unfortunately the peel characteristics under a constant load deteriorate. Therefore, it is preferable to use the cross-linking agent with the acrylic polymer A having the weight average molecular weight in the range of 700,000 to 1,000,000.

Examples of the cross-linking agent may include compounds having an epoxy group (multifunctional epoxy compounds) and compounds having an isocyanate group (multifunctional isocyanate compounds). Specific examples of the compounds having an epoxy group may include: epoxy compounds such as bisphenol A-type epoxy resins, epichlorohydrin-type epoxy resins, ethylene glycidyl ether, polyethylene glycol diglycidyl ether, glycerin diglycidyl ether, glycerin triglycidyl ether, 1,6-hexanediol glycidyl ether, trimethylolpropane triglycidyl ether, diglycidylaniline, diamine glycidylamine, N,N,N',N'-tetraglycidyl-m-xylenediamine, and 1,3-bis(N,N'-diamineglycidylaminomethyl)cyclohexane. Specific examples of the compounds having an isocyanate group may include: isocyanate compounds such as tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, and polymethylene polyphenyl isocyanate; and adducts of these isocyanate compounds and polyols such as trimethylolpropane.

In the case in which the cross-linking agent is used, if the amount thereof in the adhesive coating solution is too small, the holding power of the acrylic adhesive tape tends to become low. If the amount is too large, the tackiness of the acrylic adhesive tape tends to decrease. Therefore, the amount of the cross-linking agent is preferably 0.5 to 3 parts by mass and more preferably 1.0 to 2.0 parts by mass based on 100 parts by mass of the total of the polymer syrup and the adhesion-imparting polymer.

The molecular weight distribution of the acrylic adhesive layer formed in the presence of the cross-linking agent may substantially coincide with the molecular weight distribution of the acrylic adhesive layer formed in the absence of the cross-linking agent (2.4 to 4.4) but may not coincide therewith because the cross-linking reaction due to the cross-linking agent occurs. For example, the molecular weight distribution may become narrow, i.e., 2.2 to 2.8 and preferably 2.4 to 2.7.

Additives added to a general adhesive such as: fillers such as inorganic materials, for example, calcium carbonate, aluminum hydroxide, silica, clay, talc, and titanium oxide, inorganic hollow materials, for example, glass balloons, Shirasu balloons, and ceramic balloons, organic materials, for example, nylon beads, acrylic beads, and silicon beads, and organic hollow materials, for example, vinylidene chloride balloons and acrylic balloons; a foaming agent; dyes; pigments; a polymerization inhibitor; and a stabilizer may be added to the adhesive coating solution so long as the effects of the present invention are not impaired.

EXAMPLES

The present invention will next be specifically described by way of Examples.

Reference Examples 1 to 6

Preparation of Polymer Syrups

A 2 L reaction vessel equipped with a nitrogen introduction tube, a stirrer, and a thermometer was charged with a mixture having a composition shown in TABLE 1. Nitrogen gas was introduced to the reaction vessel (nitrogen flow quantity: 300 mL, nitrogen purge time: 60 minutes), and the mixture was heated to a polymerization initiation temperature shown in TABLE 1 under stirring (150 rpm). Then ultraviolet rays (365 nm) were applied at a power of 40 mW/cm² for 10 seconds, and the mixture was left to stand for 40 seconds (idling interval). This irradiation-idling cycle was repeated the number of times shown in TABLE 1. A polymer syrup (corresponding to polymer syrup A) having a viscosity, polymerization rate, weight average molecular weight, and molecular weight distribution shown in TABLE 1 was thereby obtained.

The viscosity was measured at 25° C. using a B-type viscometer (manufactured by TOKYO KEIKI Inc.) equipped with rotor No. 2.

The polymerization rate was determined as follows. 0.5 g of a polymer syrup was weighed, placed in a container reduced in pressure to 660 Pa, and left to stand at 120° C. for 2 hours to volatilize volatile components. The polymer syrup was again weighed to determine the amount of weight reduction. The amount of weight reduction was considered to be due to remaining monomers and oligomers, and the polymerization rate was determined using the following formula.

Polymerization rate [%]=[1−(amount of weight reduction/weight of adhesive before volatilization treatment)]×100

The weight average molecular weight and the molecular weight distribution were determined by gel permeation chromatography (Shodex GPC SYSTEM-21, Showa Denko K.K.).

TABLE 1

| | Reference Example | | | | | |
|---|---|---|---|---|---|---|
| Ingredients (g) | 1 | 2 | 3 | 4 | 5 | 6 |
| 2-Ethylhexyl acrylate | 300 | 300 | 300 | 300 | 300 | 300 |
| Butyl acrylate | 700 | 700 | 700 | 700 | 700 | 700 |
| Acrylic acid | 50 | 50 | 50 | 50 | 50 | 50 |
| 2-Hydroxyethyl acrylate | 3 | 3 | 3 | 3 | 3 | 3 |
| 2-Hydroxy-2-methyl-1-phenylpropane-1-one | 0.6 | 0.6 | 0.6 | 0.6 | 0.6 | 0.6 |
| n-dodecyl mercaptan | 1.0 | 0.6 | 0.2 | 0.2 | — | — |
| Polymerization initiation temperature (° C.) | 95.0 | 85.0 | 85.0 | 75.0 | 85.0 | 70.0 |
| Number of times of ultraviolet irradiation | 15 | 18 | 15 | 15 | 9 | 7 |
| Viscosity [cps] (25° C.) | 990 | 275 | 1325 | 1440 | 1330 | 2075 |
| Polymerization rate (%) | 30.9 | 15.5 | 18.1 | 16.2 | 11.3 | 7.8 |
| Weight average molecular weight [×10⁴] | 26 | 37 | 74 | 87 | 146 | 297 |
| Molecular weight distribution | 1.9 | 1.7 | 2.2 | 2.1 | 2.7 | 2.5 |

Reference Example 7

Preparation of Adhesion-Imparting Polymer

A 2 L reaction vessel equipped with a nitrogen introduction tube, a stirrer, and a thermometer was charged with 5,820 g of cyclohexyl methacrylate (CHMA), 180 g of methacrylic acid, 20 g of 2-hydroxy-2-methyl-1-phenyl-propane-1-one (DC1173, Nihon Ciba-Geigy K.K.), and 240 g of n-dodecyl mercaptan. The reaction mixture was stirred (200 rpm) while nitrogen gas was introduced (nitrogen flow quantity: 6 L, nitrogen purge time: 30 minutes) and then heated to 60.0° C. The reaction mixture was irradiated with ultraviolet rays (365 nm) at a power of 40 mW/cm² for 30 minutes and left to stand for about 10 minutes until the temperature of the heated reaction mixture reached 70.0° C. This irradiation-idling cycle was repeated three times to obtain an adhesion-imparting polymer solution. 500 g of the obtained adhesion-imparting polymer solution was transferred to a stainless steel container and irradiated with ultraviolet rays (365 nm) at a power of 90 mW/cm² for 3 minutes using a conveyer-type ultraviolet irradiation device ECS-151U manufactured by EYE GRAPHICS Co., Ltd. An adhesion-imparting polymer having a weight average molecular weight of 7,153 was thereby obtained.

Examples 1 to 4 and Comparative Examples 1 and 2

Production of Acrylic Adhesive Tapes in the Absence of Cross-Linking Agent 100 g of the polymer syrup in one of Reference Examples 1 to 6 (R1 to R6), 20 g of the adhesion-imparting polymer in Reference Example 7, 6.67 g of t-butyl acrylate, 6.67 g of phenoxy ethyl acrylate, and 0.53 g of a photopolymerization initiator (bis(2,4,6-trimethylbenzoyl)-phenylphosphine oxide) were uniformly mixed to prepare an ultraviolet curable adhesive coating solution.

The obtained ultraviolet curable adhesive coating solution was applied to release paper prepared by subjecting both sides of high-quality paper to silicone release treatment to a thickness of 50 μm using a coater (UV coater) provided with an ultraviolet irradiation furnace that included insect trapping fluorescent lamps (main wavelength: 352 nm, 0.44 mW/cm$^2$) arranged at intervals of 60 mm and was capable of irradiating an irradiation object with ultraviolet rays at about 2.00 mW/cm$^2$ from a height of 200 mm. Then a polypropylene nonwoven fabric substrate having a thickness of 50 m was placed on the coating, and the adhesive coating solution was further applied to the nonwoven fabric substrate. A transparent polyester film having a thickness of 50 μm and subjected to silicone release treatment on one side was placed on the coating, whereby a multilayer tape including a stacked-type adhesive coating film composed of the adhesive coating solution film/nonwoven fabric/adhesive coating solution film with the thickness of the multilayer-type adhesive coating film adjusted to 0.15 mm was obtained. The multilayer tape was irradiated with ultraviolet rays for 60 seconds through the transparent polyester film of the multilayer tape in the ultraviolet irradiation furnace in the UV coater. Then ultraviolet irradiation was performed at an irradiation intensity of 35.5 mW/cm$^2$ for 30 seconds using a high-pressure mercury lamp (main wavelength: 365 nm, power: 80 mW/cm$^2$) to sufficiently cure the ultraviolet curable adhesive coating solution, and a double-sided acrylic adhesive transfer tape was thereby obtained.

Examples 5 to 8 and Comparative Examples 3 and 4

Production of Acrylic Adhesive Tapes in the Presence of Cross-Linking Agent 100 g of the polymer syrup in one of Reference Examples 1 to 6 (R1 to R6), 20 g of the adhesion-imparting polymer in Reference Example 7, 6.67 g of t-butyl acrylate, 6.67 g of phenoxy ethyl acrylate, 0.53 g of a photopolymerization initiator (a 4:1 mixture of 2-hydroxy-2-methyl-1-phenyl-propane-1-one and bis(2,4,6-trimethylbenzoyl)-phenylphosphine oxide (weight ratio)), and 1.78 g of a polyisocyanate-based cross-linking agent (CORONATE L, Nippon Polyurethane Industry Co., Ltd.) were uniformly mixed to prepare an ultraviolet curable adhesive coating solution.

Double-sided acrylic adhesive transfer tapes were obtained as in Example 1 using the obtained ultraviolet curable adhesive coating solutions.

<Evaluation of Double-Sided Acrylic Adhesive Tapes>

For each of the double-sided acrylic adhesive tapes obtained in Examples 1 to 8 and Comparative Examples 1 to 4, the weight average molecular weight and molecular weight distribution of the acrylic adhesive layers were tested and evaluated as follows, and the tape was also tested and evaluated for its 180 degree peel strength, holding power, adhesion to a curved surface, and constant-load peeling as follows. The results obtained are shown in Tables 2 and 3.

The weight average molecular weight of the adhesive layers (the molecular weight of a soluble adhesive component) and their molecular weight distribution were measured using a gel permeation chromatograph (Shodex GPC SYSTEM-21, manufactured by Showa Denko K.K.) using tetrahydrofuran as an eluent. The molecular weight of the soluble adhesive component substantially corresponds to the weight average molecular weight of the acrylic polymer B. The soluble adhesive component herein means a component capable of being eluted with the tetrahydrofuran eluent during analysis in the gel permeation chromatograph.

<180 Degree Peel Strength>

A stainless steel (SUS304) plate (SUS plate) having a thickness of 2 mm and polished with No. 280 waterproof abrasive paper and a polystyrene (PS) plate having a thickness of 2 mm were prepared as adherends. Adhesive tapes having a width of 20 mm were temporarily applied to the adherends, and the release films were removed. Then non-release-treated 25 μm-thick polyethylene terephthalate films having a width of 20 mm (width: 20 mm, length: 150 mm) were bonded to the exposed adhesive layers by passing them back and forth one time between pressure rollers with a load of 2 kg. A peel strength (N/20 mm) when the polyethylene terephthalate film was pulled at a pulling rate of 300 mm/minutes in a 180 degree direction was measured using a tensile tester (TENSILON RTA-250, ORIENTEC Co., Ltd.). The larger the numerical value of the peel strength, the more preferred.

<Holding Power>

Measurement was performed according to a method of measuring holding power in JIS Z0237. In this case, a stainless steel plate having a thickness of 2 mm and polished with No. 280 waterproof abrasive paper and a polyethylene terephthalate film having a thickness of 25 μm were used as adherends, and a bonding area of 25 mm 25 mm was employed. These were bonded using a double-sided acrylic adhesive tape, and a load of 1 kgf was applied perpendicularly to the stainless steel plate. The bonded product was left to stand at 180° C. for 1 hour, and the degree of displacement in the bonded portion after the product was left to stand was measured. If the stainless steel plate fell off before 1 hour elapsed, the time at which the stainless steel plate fell off was measured.

<Adhesion to Curved Surface>

A double-sided acrylic adhesive tape having a width of 20 mm and a length of 150 mm was temporarily applied to an aluminum plate (thickness: 0.5 mm, width: 20 mm, length: 150 mm), and the release film was removed. The aluminum plate was bonded to the central portion of a 2 mm-thick polystyrene (PS) plate or a 2 mm-thick acrylonitrile-butadiene-styrene (ABS) copolymer plate (each having a width of 25 mm and a length of 200 mm) by passing them back and forth one time between 2 kg pressure rollers, with 25-mm non-bonded portions remaining at opposite ends. The product was cured at room temperature for 24 hours, then bent such that the distance between the opposite ends was 190 mm with the aluminum plate facing up, and left to stand in a thermostatic bath at 60° C. for 24 hours while the bent state was maintained. Then the peel distances of the ends of the aluminum plate separated from the PS or ABS plate were measured. The shorter the peel distances, the more preferred.

<Constant-Load Peeling>

2 mm-thick PS and acrylic plates were prepared as adherends. Adhesive tapes having a width of 20 mm (length: 70 mm) were temporarily applied to these plates, and the release films were removed. Then non-release-treated 25 μm-thick polyethylene terephthalate films having a width of 20 mm (width: 20 mm, length: 150 mm) were bonded to the exposed adhesive layers by passing them back and forth one time between pressure rollers with a load of 2 kg, and the products were left to stand at room temperature for 1 hour. A 100 g weight was attached to one end of each polyethylene terephthalate film to apply a load in a direction 90 degrees relative to the PS plate, and the peel distance of the adhesive tape was measured. The shorter the peel distance, the more preferred.

TABLE 2

| | | Comparative Example | | Example | | | |
|---|---|---|---|---|---|---|---|
| | | 1 | 2 | 1 | 2 | 3 | 4 |
| Polymer syrup | Reference Example | 1 | 2 | 3 | 4 | 5 | 6 |
| | Weight average molecular weight [×10$^4$] | 26 | 37 | 74 | 87 | 146 | 297 |
| | Molecular weight distribution | 1.9 | 1.7 | 2.2 | 2.1 | 2.7 | 2.5 |
| Acrylic adhesive layer (Soluble adhesive component) | Weight average molecular weight [×10$^4$] | 28 | 34 | 52 | 48 | 61 | 65 |
| | Molecular weight distribution | 2.2 | 2.4 | 3.1 | 2.9 | 3.8 | 4.2 |
| 180 Degree peel strength [N/20 mm] | SUS | 18.3 | 19.4 | 17.3 | 17.0 | 16.7 | 17.1 |
| | PS | — | — | — | — | — | — |
| Holding power Peel distance [mm] or falling time [min] | 40° C. | 18 min | 20 min | 51 min | 52 min | 9.6 mm | 11.0 mm |
| | 100° C. | — | — | — | — | — | — |
| Adhesion to curved surface [mm] | PS | 2.6 | 1.6 | 1.0 | 0.0 | 0.0 | 0.0 |
| | ABS | 3.5 | 2.1 | 1.1 | 1.4 | 0.0 | 0.0 |
| Constant load peeling [mm] | PS | 37.3 | 21.0 | 6.8 | 8.0 | 4.3 | 4.5 |
| | Acrylic | 36.5 | 21.0 | 6.8 | 8.8 | 3.8 | 3.8 |

TABLE 3

| | | Comparative Example | | Example | | | |
|---|---|---|---|---|---|---|---|
| | | 3 | 4 | 5 | 6 | 7 | 8 |
| Polymer syrup | Reference Example | 1 | 2 | 3 | 4 | 5 | 6 |
| | Weight average molecular weight [×10$^4$] | 26 | 37 | 74 | 87 | 146 | 297 |
| | Molecular weight distribution | 1.9 | 1.7 | 2.2 | 2.1 | 2.7 | 2.5 |
| Acrylic adhesive layer (Soluble adhesive component) | Weight average molecular weight [×10$^4$] | 64 | 59 | 36 | 39 | 35 | 39 |
| | Molecular weight distribution | 4.2 | 4.0 | 2.6 | 2.7 | 2.4 | 2.6 |
| 180 Degree peel strength [N/20 mm] | SUS | 17.4 | 16.6 | 15.1 | 15.5 | 14.5 | 14.9 |
| | PS | 17.3 | 16.4 | 14.5 | 14.7 | 14.6 | 15.0 |
| Holding power Peel distance [mm] or falling time [min] | 40° C. | 2.1 mm | 1.2 mm | 0.6 mm | 0.6 mm | 0.6 mm | 0.7 mm |
| | 100° C. | 7 min | 23 min | 0.8 mm | 0.7 mm | 0.5 mm | 0.6 mm |
| Adhesion to curved surface [mm] | PS | 0.0 | 0.0 | 0.0 | 0.0 | 0.0 | 0.0 |
| | ABS | 0.0 | 0.0 | 0.0 | 0.0 | 0.0 | 0.0 |
| Constant load peeling [mm] | PS | 3.8 | 2.5 | 1.8 | 2.0 | 1.5 | 1.5 |
| | Acrylic | 3.5 | 3.3 | 4.5 | 4.8 | 6.3 | 7.3 |

<Evaluation Results>

Figure 2:
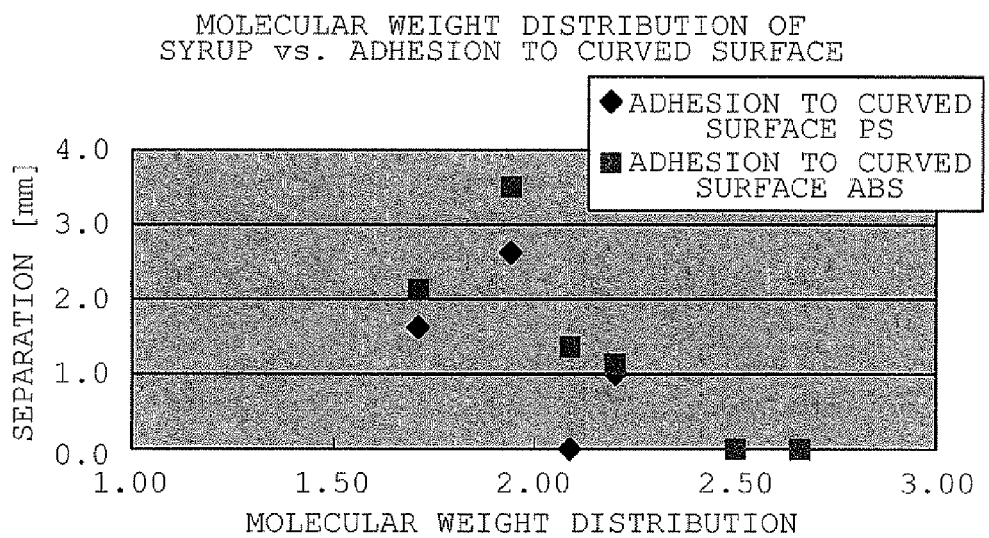
FIG. 2 is a graph showing the relation between the molecular weight distribution of a polymer syrup and adhesion to a curved surface in Examples 1 to 4 and Comparative Examples 1 and 2.
Figure 3:
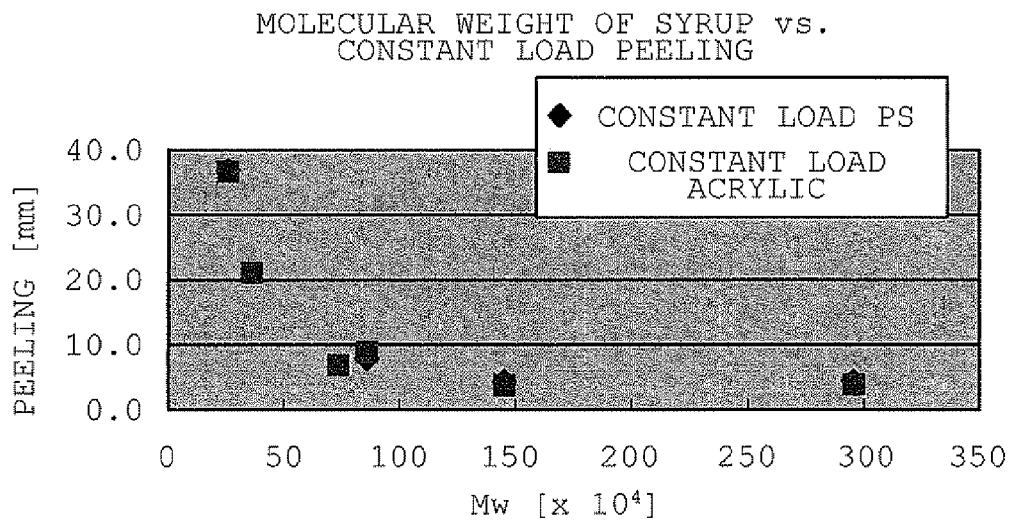
FIG. 3 is a graph showing the relation between the molecular weight of a polymer syrup and constant-load peeling in Examples 1 to 4 and Comparative Examples 1 and 2.
Figure 4:
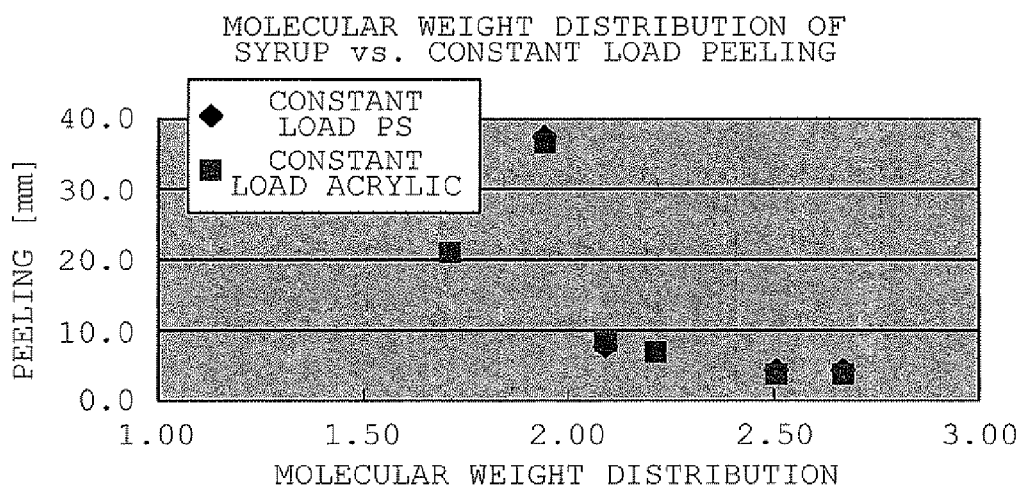
FIG. 4 is a graph showing the relation between the molecular weight distribution of a polymer syrup and constant-load peeling in Examples 1 to 4 and Comparative Examples 1 and 2.
Figure 5:
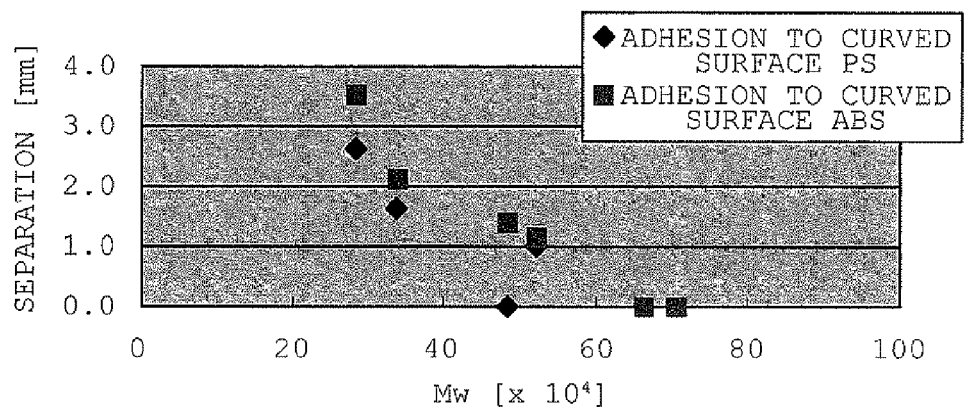
FIG. 5 is a graph showing the relation between the weight average molecular weight of an acrylic adhesive layer (the molecular weight of a soluble adhesive component) and adhesion to a curved surface in Examples 1 to 4 and Comparative Examples 1 and 2.
Figure 6:
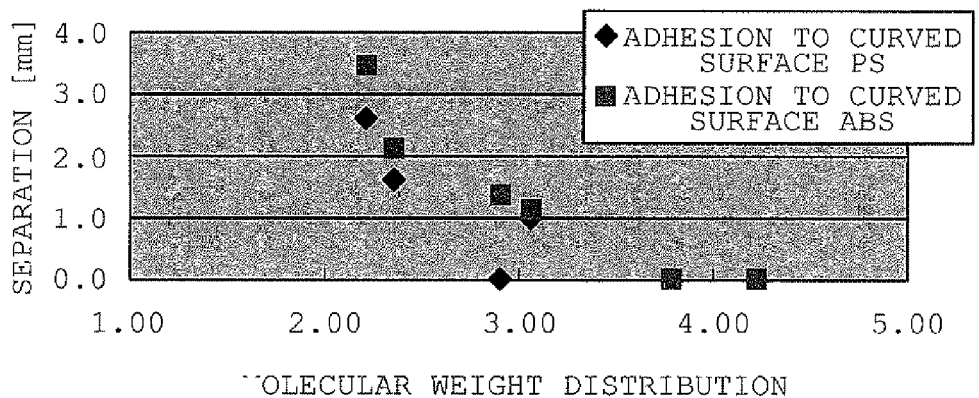
FIG. 6 is a graph showing the relation between the molecular weight distribution of an acrylic adhesive layer (the molecular weight distribution of a soluble adhesive component) and adhesion to a curved surface in Examples 1 to 4 and Comparative Examples 1 and 2.
Figure 7:
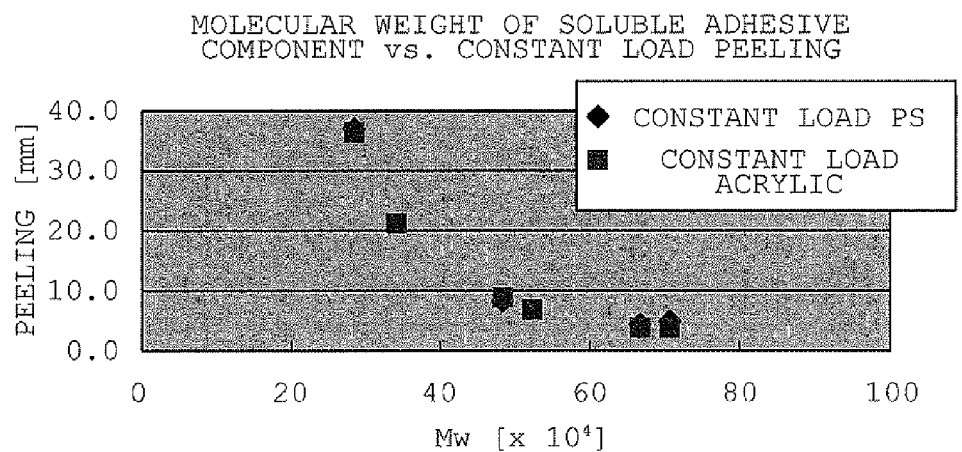
FIG. 7 is a graph showing the relation between the weight average molecular weight of an acrylic adhesive layer (the molecular weight of a soluble adhesive component) and constant-load peeling in Examples 1 to 4 and Comparative Examples 1 and 2.
Figure 8:
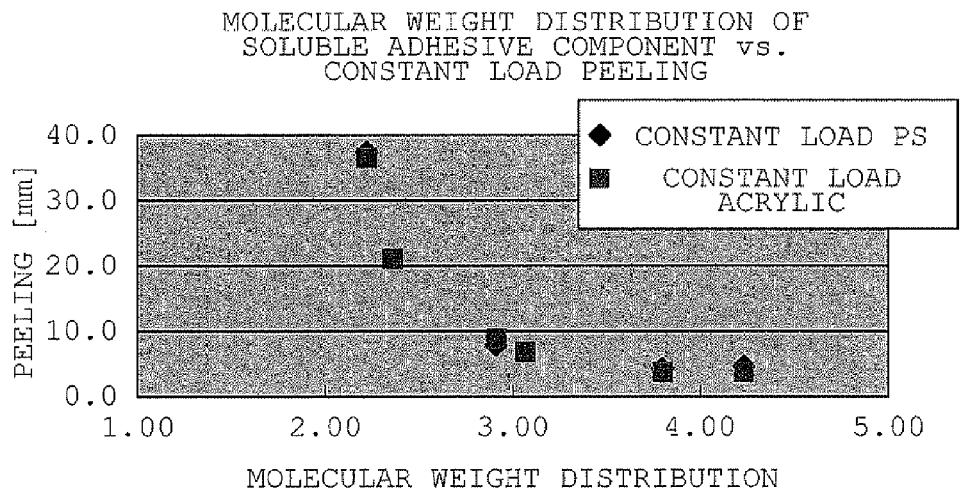
FIG. 8 is a graph showing the relation between the molecular weight distribution of an acrylic adhesive layer (the molecular weight distribution of a soluble adhesive component) and constant-load peeling in Examples 1 to 4 and Comparative Examples 1 and 2.
Figure 9:
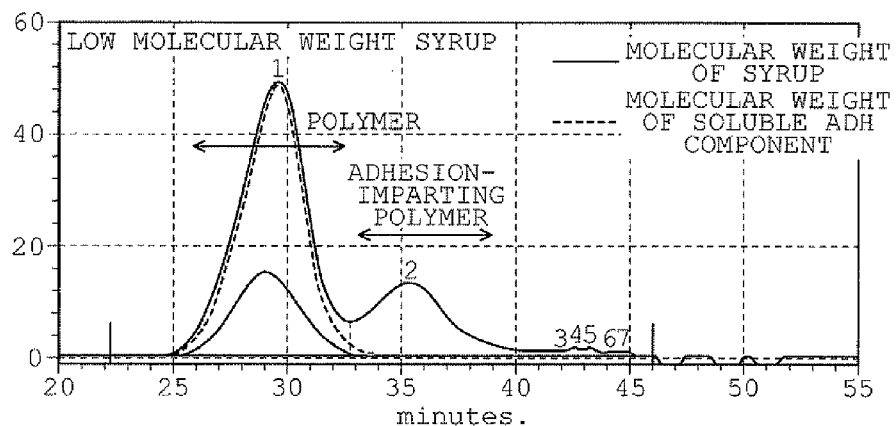
FIG. 9 is a gel permeation chart of an acrylic adhesive layer when the weight average molecular weight of a polymer in a polymer syrup is about 300,000.
Figure 10:
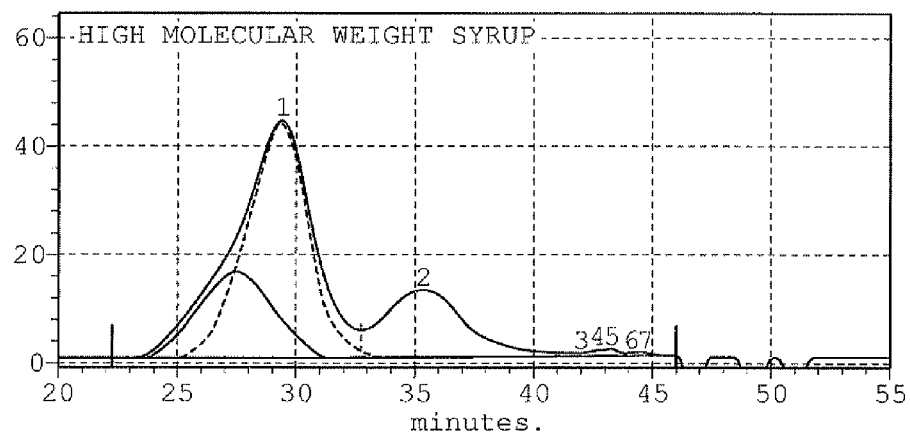
FIG. 10 is a gel permeation chart of an acrylic adhesive layer when the weight average molecular weight of a polymer in a polymer syrup is about 700,000.
Figure 11:
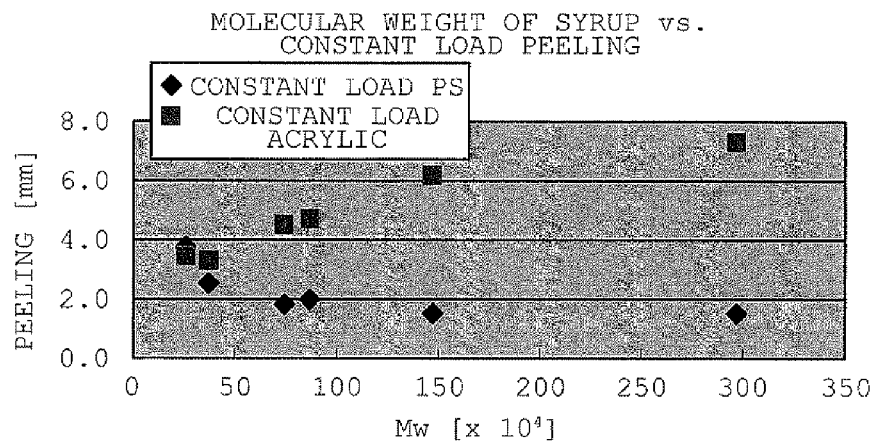
FIG. 11 is a graph showing the relation between the molecular weight of a polymer syrup and constant-load peeling in Examples 5 to 8 and Comparative Examples 3 and 4.
Figure 12:
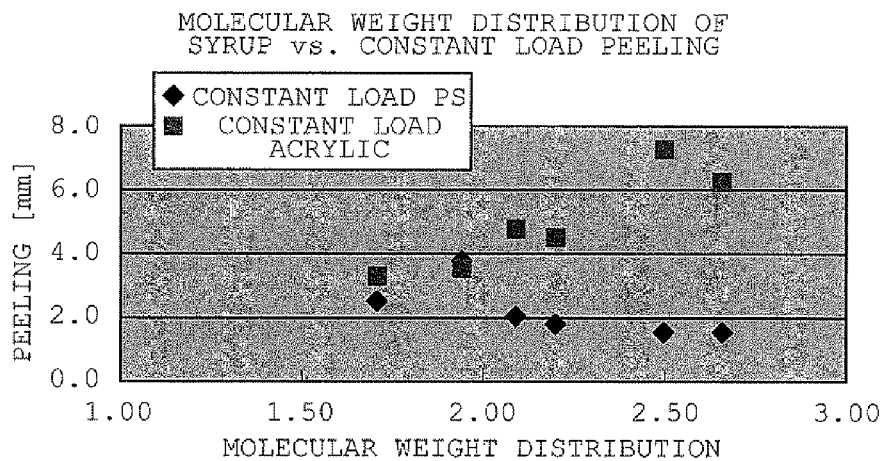
FIG. 12 is a graph showing the relation between the molecular weight distribution of a polymer syrup and constant-load peeling in Examples 5 to 8 and Comparative Examples 3 and 4.
Figure 13:
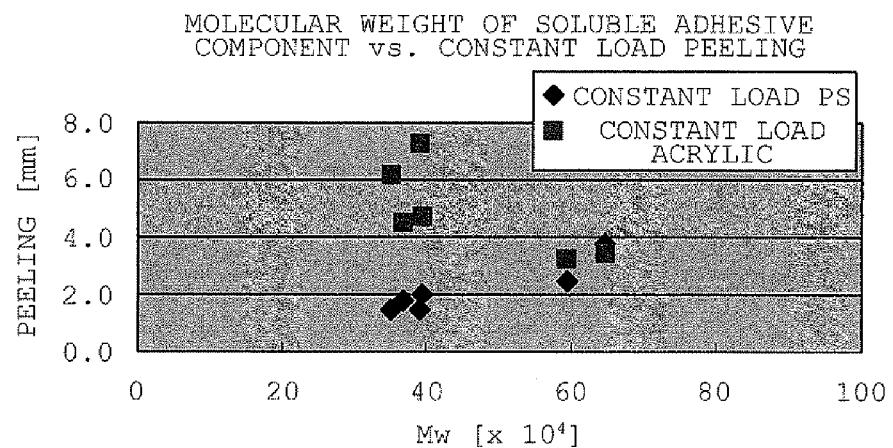
FIG. 13 is a graph showing the relation between the weight average molecular weight of an acrylic adhesive layer (the molecular weight of a soluble adhesive component) and constant-load peeling in Examples 5 to 8 and Comparative Examples 3 and 4.
Figure 14:
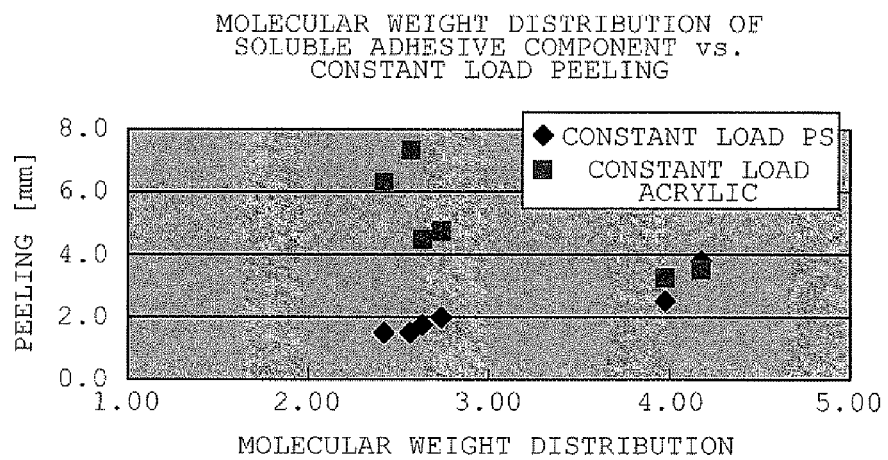
FIG. 14 is a graph showing the relation between the molecular weight distribution of an acrylic adhesive layer (the molecular weight distribution of a soluble adhesive component) and constant-load peeling in Examples 5 to 8 and Comparative Examples 3 and 4.

FIG. 1 is a graph showing the relation between the molecular weight of a polymer syrup and adhesion to a curved surface; FIG. 2 is a graph showing the relation between the molecular weight distribution of a polymer syrup and adhesion to a curved surface; FIG. 3 is a graph showing the relation between the molecular weight of a polymer syrup and constant-load peeling; FIG. 4 is a graph showing the relation between the molecular weight distribution of a polymer syrup and constant-load peeling; FIG. 5 is a graph showing the relation between the weight average molecular weight of an acrylic adhesive layer (the molecular weight of a soluble adhesive component) and adhesion to a curved surface; FIG. 6 is a graph showing the relation between the molecular weight distribution of an acrylic adhesive layer (the molecular weight distribution of a soluble adhesive component) and adhesion to a curved surface; FIG. 7 is a graph showing the relation between the weight average molecular weight of an acrylic adhesive layer (the molecular weight of a soluble adhesive component) and constant-load peeling; and FIG. 8 is a graph showing the relation between the molecular weight distribution of an acrylic adhesive layer (the molecular weight distribution of a soluble adhesive component) and constant-load peeling. FIG. 9 shows a gel permeation chart of an acrylic adhesive layer when the weight average molecular weight of a polymer in a polymer syrup is about 300,000, and FIG. 10 shows a gel permeation chart of an acrylic adhesive layer when the weight average molecular weight of a polymer in a polymer syrup is about 700,000. FIG. 11 is a graph showing the relation between molecular weight and constant-load peeling. FIG. 12 is a graph showing the relation between the molecular weight distribution of a polymer syrup and constant-load peeling. FIG. 13 is a graph showing the relation between the weight average molecular weight of an acrylic adhesive layer (the molecular weight of a soluble adhesive component) and constant-load peeling. FIG. 14 is a graph showing the relation between the molecular weight distribution of an acrylic adhesive layer (the molecular weight distribution of a soluble adhesive component) and constant-load peeling.

(Evaluation of Double-Sided Adhesive Tapes Including Acrylic Adhesive Layers Formed in the Absence of Cross-Linking Agent)

As can be seen from the results in Examples 1 to 4, from the results in Comparative Examples 1 and 2 in which the molecular weights of the acrylic polymers A were low, and from FIGS. 1 to 8, the results for the adhesion to a curved surface and the constant-load peeling showed that the higher the weight average molecular weights of a polymer syrup and an acrylic adhesive layer, the better the values. In addition, there was a tendency that the broader the molecular weight distribution, the better the obtained results.

The holding power will next be described. In each of Examples 3 and 4, the displacement found was only small, and good holding power was obtained. In each of Examples 1 and 2, the stainless steel plate fell off, as did Comparative Examples 1 and 2. However, the time until the stainless steel plate fell off was longer by at least 30 minutes than that in Comparative Examples 1 and 2. Such a level indicates that, when an object to be held is light, no problem occurs.

As can be seen by comparing FIGS. 9 and 10, there is almost no difference between the elution times of the main peaks. However, when the weight average molecular weight of a polymer syrup exceeds 700,000, a shoulder appears in the molecular weight of a soluble component, so that the molecular weight distribution becomes broad. In addition, the value of the weight average molecular weight becomes high. This indicates that the molecular weights of the polymers polymerized in the UV curing furnace in the UV coater are constant (about 300,000). Therefore, it was found that, when the molecular weight of a polymer syrup is relatively small, the molecular weight of the polymer syrup is close to the molecular weight of the polymer polymerized in the UV coater, and the weight average molecular weight and molecular weight distribution of the adhesive finally obtained become small, so that the adhesion to a curved surface and peel characteristics under a constant load become deteriorated.

However, when the molecular weight of a polymer syrup is relatively high as is the present invention, the graph of the molecular weight of the polymer syrup is superposed on the graph of the molecular weight of the polymer polymerized in the UV coater, and the weight average molecular weight and molecular weight distribution increase, so that the adhesion to a curved surface and also the peel characteristics under a constant load become preferable. Therefore, it was found that good characteristics are achieved by covering a high polymer region that cannot be obtained by polymerization using the UV coater by the polymer syrup.

(Evaluation of Double-Sided Adhesive Tapes Having Acrylic Adhesive Layers Formed in the Presence of Cross-Linking Agent)

As can be seen from the results in Examples 5 to 8, from the results in Comparative Examples 3 and 4 in which the molecular weights of the acrylic polymers A were low, and from FIGS. 11 to 14, the PS peel characteristics under a constant load in the presence of a cross-linking agent showed a tendency that the numerical value obtained became better as the weight average molecular weight and molecular weight distribution of the polymer syrup became larger, as did the results in the absence of a cross-linking agent. However, the acrylic peel characteristics under a constant load showed a reverse tendency. In addition, the numerical value of the PS peeling under a constant load tended to gradually increase (became worse) as the weight average molecular weight and molecular weight distribution of the soluble adhesive component increased. The acrylic peel characteristics under a constant load tended to gradually decrease as the weight average molecular weight and molecular weight distribution of the soluble adhesive component decreased. This shows that the balance between the one- and two-dimensional structures of the polymers and the three-dimensional structure relating to the cross-linking agent is important for the peel characteristics under a constant load. As for the adhesion to a curved surface, no separation occurred irrespective of conditions. Therefore, no performance problem occurs so long as the weight average molecular weight of the polymer syrup is 300,000 or larger.

As can be seen also from the evaluation results for the 180 degree peel test and holding power, the numerical values obtained tended to become better when the weight average molecular weight of the polymer syrup exceeded 700,000 or as the molecular weight distribution increased.

INDUSTRIAL APPLICABILITY

The acrylic adhesive tape of the present invention is configured to include an acrylic adhesive layer composed of: an acrylic polymer mixture of a large-molecular weight acrylic polymer having a weight average molecular weight of 700,000 to 3,000,000 and a low molecular weight acrylic polymer having a weight average molecular weight of 350,000 to 650,000; and a very low molecular weight adhesion-imparting polymer added to the acrylic polymer mixture and having a weight average molecular weight of 2,000 to 10,000. The molecular weight distribution of the acrylic adhesive layer is controlled within a specific range. Therefore, the acrylic adhesive tape can have good adhesion to a curved surface and good peel characteristics under a constant load even in the absence of a cross-linking agent. Accordingly, the acrylic adhesive tape of the present invention is useful for bonding structural materials for automobiles, electrical products, buildings, etc. According to the method of producing the acrylic adhesive tape of the present invention, an acrylic monomer composition containing a photopolymerization initiator is photo-polymerized to prepare a polymer syrup containing an acrylic polymer having a weight average molecular weight of 700,000 to 3,000,000; an adhesion-imparting polymer having a weight average molecular weight of 2,000 to 10,000 is added thereto, and the resultant mixture is formed into a film; and then an unreacted portion of the acrylic monomer remaining in the film is photo-polymerized to form an acrylic polymer having a weight average molecular weight of 350,000 to 650,000, whereby finally an acrylic adhesive layer having a relatively broad molecular weight distribution is formed. Therefore, good adhesion to a curved surface and good peel characteristics under a constant load can be imparted to the obtained acrylic adhesive tape even in the absence of a cross-linking agent. Accordingly, the acrylic adhesive tape of the present invention can be useful for the production of acrylic adhesive tapes for bonding structural materials for automobiles, electrical products, buildings, etc.

The invention claimed is:

1. A method of producing an acrylic adhesive tape including a release film substrate and an acrylic adhesive layer formed thereon, the method comprising the following steps (a) to (d):
    step (a) of irradiating a solvent-free photo-polymerizable monomer composition containing an acrylic monomer and a photopolymerization initiator with ultraviolet rays to produce an acrylic polymer A from the acrylic monomer by photopolymerization, the acrylic polymer A having a weight average molecular weight of 700,000 to 3,000,000 when a cross-linking agent is absent, to thereby prepare a polymer syrup containing the acrylic polymer A and an unreacted portion of the acrylic monomer;
    after preparing the polymer syrup in step (a), step (b) of mixing an adhesion-imparting polymer having a weight average molecular weight of 2,000 to 10,000 with the polymer syrup to prepare an adhesive coating solution,
    after preparing the adhesive coating solution in step (b), step (c) of applying the adhesive coating solution to the release film substrate to form an adhesive coating film; and
    after forming the adhesive coating film in step (c), step (d) of irradiating the adhesive coating film with ultraviolet rays to produce an acrylic polymer B from the unreacted portion of the acrylic monomer in the adhesive coating film by photopolymerization, the acrylic polymer B having a weight average molecular weight of 350,000 to 650,000 when a cross-linking agent is absent, to thereby form an acrylic adhesive layer having a molecular weight distribution of 2.4 to 4.4.

2. The production method according to claim 1, wherein the polymer syrup in the step (a) has a viscosity of 200 to 5,000 cps at 25° C.

3. The production method according to claim 1, wherein the acrylic polymer A in the step (a) has a weight average molecular weight of 750,000 to 1,000,000.

4. The production method according to claim 1, wherein 5 to 25% of the solvent-free photo-polymerizable monomer composition is polymerized in the step (a).

5. The production method according to claim 1, wherein the solvent-free photo-polymerizable monomer composition includes, as the acrylic monomers, a (meth)acrylate which may be substituted with a hydroxy group, and (meth)acrylic acid.

6. The production method according to claim 1, wherein the solvent-free photo-polymerizable monomer composition includes, as the acrylic monomers, 2-ethylhexyl acrylate, butyl acrylate, acrylic acid, and 2-hydroxyethyl acrylate.

7. The production method according to claim 1, wherein the solvent-free photo-polymerizable monomer composition includes, as the acrylic monomers, 25 to 35 parts by mass of 2-ethylhexyl acrylate, 75 to 65 parts by mass of butyl acrylate, and 3 to 5 parts by mass of acrylic acid and 0.2 to 0.5 parts by mass of 2-hydroxyethyl acrylate based on 100 parts by mass of the total of 2-ethylhexyl acrylate and butyl acrylate.

8. The production method according to claim 1, wherein the solvent-free photo-polymerizable monomer composition includes 0.005 to 0.1 parts by mass of the photopolymerization initiator based on 100 parts by mass of the acrylic monomers.

9. The production method according to claim 1, wherein ultraviolet irradiation in the step (a) is performed under conditions such that the irradiation is performed 5 to 20 times at idling intervals of 20 to 40 seconds in an inert gas atmosphere, at a polymerization initiation temperature of 25 to 130° C., with light having a wavelength of 250 to 400 nm and an output power of 15 to 100 mW/cm$^2$ for 10 to 60 seconds.

10. The production method according to claim 1, wherein the adhesion-imparting polymer used in the step (b) is an acrylic adhesion-imparting polymer.

11. The production method according to claim 10, wherein the acrylic adhesion-imparting polymer is one produced by photopolymerization of a cycloalkyl (meth)acrylate, (meth)acrylic acid, a thiol, and a photopolymerization initiator.

12. The production method according to claim 10, wherein the acrylic adhesion-imparting polymer is one produced by photopolymerization of cyclohexyl methacrylate, methacrylic acid, n-dodecyl mercaptan, and a photopolymerization initiator.

13. The production method according to claim 10, wherein the acrylic adhesion-imparting polymer is one produced by photopolymerization of 95 to 97 parts by mass of cyclohexyl methacrylate, 3 to 5 parts by mass of methacrylic acid, 3 to 6 parts by mass of n-dodecyl mercaptan, and 0.25 to 0.5 parts by mass of the photopolymerization initiator.

14. The production method according to claim 1, wherein the adhesion-imparting polymer used in the step (b) has a weight average molecular weight of 3,000 to 8,000.

15. The production method according to claim 1, wherein the photopolymerization in preparing the adhesion-imparting polymer used in the step (b) is performed under conditions such that irradiation is performed 5 to 20 times at idling intervals of 20 to 40 seconds in an inert gas atmosphere, at a temperature of 25 to 130° C., with light having a wavelength of 250 to 400 nm and an output power of 15 to 100 mW/cm$^2$ for 10 to 60 seconds.

16. The production method according to claim 1, wherein the acrylic polymer B in the step (d) has a weight average molecular weight of 450,000 to 650,000.

17. The production method according to claim 1, wherein ultraviolet irradiation in the step (d) is performed under conditions such that the irradiation is performed in an inert gas atmosphere, at a temperature of 40 to 90° C., with light having a wavelength of 250 to 400 nm and an output power of 15 to 100 mW/cm$^2$ for 10 to 60 seconds.

18. The production method according to claim 1, wherein a cross-linking agent is further added to the adhesive coating solution in the step (c).

* * * * *